US009626567B2

(12) United States Patent
Ahmed

(10) Patent No.: US 9,626,567 B2
(45) Date of Patent: Apr. 18, 2017

(54) AUTOMATED VIDEO CAMPAIGN BUILDING

(71) Applicant: Visible Measures Corp., Boston, MA (US)

(72) Inventor: Wamiq M. Ahmed, Woburn, MA (US)

(73) Assignee: Visible Measures Corp., Boston, MA (US)

( * ) Notice: Subject to any disclaimer, the term of this patent is extended or adjusted under 35 U.S.C. 154(b) by 0 days.

(21) Appl. No.: 13/798,645

(22) Filed: Mar. 13, 2013

(65) Prior Publication Data

US 2014/0270542 A1    Sep. 18, 2014

(51) Int. Cl.
*G06K 9/00* (2006.01)

(52) U.S. Cl.
CPC .............................. *G06K 9/00711* (2013.01)

(58) Field of Classification Search
CPC ...... G06T 7/0028; G06T 7/003; G06T 7/0038
See application file for complete search history.

(56) References Cited

U.S. PATENT DOCUMENTS

| | | | |
|---|---|---|---|
| 5,565,998 A * | 10/1996 | Coombs et al. | 386/233 |
| 6,675,174 B1 * | 1/2004 | Bolle et al. | |
| 6,751,354 B2 * | 6/2004 | Foote et al. | 382/224 |
| 7,035,867 B2 * | 4/2006 | Thompson et al. | |
| 7,167,574 B2 * | 1/2007 | Kim | 382/100 |
| 7,486,827 B2 * | 2/2009 | Kim | 382/209 |
| 7,532,804 B2 * | 5/2009 | Kim | 386/252 |
| 8,498,490 B1 * | 7/2013 | Baluja et al. | 382/218 |
| 8,639,040 B2 * | 1/2014 | Zhang et al. | 382/218 |
| 2002/0097893 A1 | 7/2002 | Lee et al. | |
| 2003/0174859 A1 * | 9/2003 | Kim | 382/100 |
| 2004/0240562 A1 | 12/2004 | Bargeron et al. | |
| 2009/0040311 A1 | 2/2009 | Okamoto et al. | |
| 2010/0329547 A1 | 12/2010 | Cavet | |
| 2011/0081075 A1 * | 4/2011 | Adcock et al. | 382/165 |
| 2011/0085728 A1 * | 4/2011 | Gao et al. | 382/165 |
| 2012/0185568 A1 | 7/2012 | Broyde et al. | |
| 2012/0275705 A1 * | 11/2012 | Duan et al. | 382/195 |
| 2013/0177252 A1 * | 7/2013 | Hefeeda et al. | 382/218 |

OTHER PUBLICATIONS

Chen, Li, Stentiford, F.W.M., "Video sequence matching based on temporal ordinal measurement". Pattern Recognition Letters. vol. 29, 2008. pp. 1824-2831.*
International Search Report, PCT/US2014/025155, Aug. 20, 2014.

* cited by examiner

*Primary Examiner* — Kim Vu
*Assistant Examiner* — Molly Delaney
(74) *Attorney, Agent, or Firm* — David H. Judson

(57) ABSTRACT

A method to automatically classify video content retrieved over the Internet and, in particular, to determine whether a candidate video is an instance of a source video. The method begins by sampling static image frames from each of the candidate video and the source video. Based on the sampled static image frames, a set of static image frames in the candidate video that match a corresponding set of static image frames in the source video are then identified. Metadata associated with the sets of matching static image frames are then compared to determine how closely a temporal order of the set of static image frames in the candidate video matches the temporal order of the set of static image frames in the source video. Based on a measure of temporal order match, a classification is then applied to the candidate video to complete the method.

20 Claims, 2 Drawing Sheets

AUTOMATED VIDEO CAMPAIGN BUILDING

BACKGROUND

Technical Field

This disclosure relates generally to Internet video audience behavior measurement, consumption, tracking, and reporting.

Background of the Related Art

Many destination web sites offer web-based services that host videos for content publishers and that allow audiences to directly consume those video clips either on their websites, or via other sites, blogs, or social networks to which their content is linked and or embedded. To be successful, it is desirable for site owners to understand their audience and their consumption habits so that a site's appeal and stickiness to end users and others (such as potential advertisers) can be tracked, managed, and optimized. Additionally, video and rich media formats are being used more and more for interactive advertising campaigns. Creatives that are provided in such formats need to be measured for audience behavior, as well to ascertain the effectiveness of such campaigns.

One known technique for tracking the "spread" of a video on the Internet involves manual review of a video to determine the video is a copy of a source video of interest. This process, however, is very time-consuming and labor-intensive, and it may be prone to errors. There remains a need in the art to automate the process of determining whether a particular video copy retrieved from a network represents a source video.

BRIEF SUMMARY

This disclosure relates to methods and systems to automate the classification of video content retrieved over the Internet. In one embodiment, an automated method is executed to determine whether a candidate video is an instance, or a variant or modified version of, a source video, where a variant or modified version may differ (from the source video) in terms of quality, temporal order, frame size, orientation or other properties. Generally, a source video typically comprises a collection of static image frames. Preferably, the method begins by sampling static image frames from each of the candidate video and the source video. Based on the sampled static image frames, a set of static image frames in the candidate video that match a corresponding set of static image frames in the source video are then identified. Preferably, this identification is effected using a feature transform, such as oriented binary robust independent elementary features (ORB), or the like. Then, "metadata" associated with the sets of matching static image frames are then compared to determine how closely a temporal order of the set of static image frames in the candidate video matches the temporal order of the set of static image frames in the source video. The metadata typically comprises indices of the matching static image frames. The latter step may be preceded by a content comparison of the sets of "matching" static image frames to determine whether any pair of matched frames should be discarded (as potentially mismatched). Based on a measure of temporal order match, a classification is then applied to the candidate video to complete the method. Typically, the classification is that the candidate video is an instance of the source video, not an instance of the source video, or a variant of the source video.

The above-described technique is useful to determine whether each of a set of videos received from one or more Internet-accessible locations is an instance of the source video. Information generated from the method can then be reported back to various entities (e.g., content providers, publishers, advertising entities, brand developers, and others) having an interest in determining the network "spread" of the video.

The foregoing has outlined some of the more pertinent features of the subject matter. These features should be construed to be merely illustrative.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
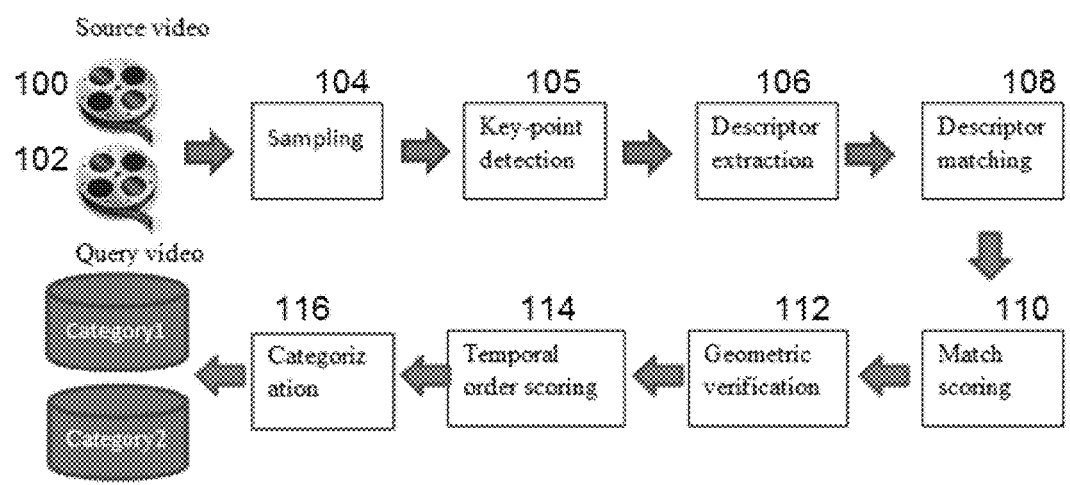
FIG. 1 is a block diagram of an automated method of classifying videos according to this disclosure.

The disclosed method may be practiced in a computing infrastructure comprising one or more data processing machines.

A representative infrastructure in which the method may be practiced is a service that tracks video consumption, audience behavior, content and advertising performance, and the like, across Internet-accessible video destinations. A representative service of this type is provided by Visible Measures® of Boston, Mass. Without meant to be limiting, a representative technology platform that implements the service comprises machines, systems, sub-systems, applications, databases, interfaces and other computing and telecommunications resources. In one particular embodiment, a service provider architecture (for video analytics) comprises an Internet Protocol (IP) switch, a set of one or more web server machines, a set of one or more application server machines, a database management system, and a set of one or more administrative server machines. A representative web server machine comprises commodity hardware (e.g., INTEL™ hardware processors), an operating system such as LINUX™, and a web server such as APACHE™ 2.x. A representative application server machine comprises commodity hardware, Linux, and an application server such as WebLogic™ 9.2 (or later). The database management system may be implemented as an ORACLE™ (or equivalent) database management package running on Linux. The infrastructure may include a name service, FTP servers, administrative servers, data collection services, management and reporting servers, other backend servers, load balancing appliances, other switches, and the like. Each machine typically comprises sufficient disk and memory, as well as input and output devices. The software environment on each machine includes a JAVA™ virtual machine (JVM) if control programs are written in Java. Generally, the web servers handle incoming business entity provisioning requests, and they export a management interface. The application servers manage the basic functions of the service including, without limitation, business logic. As will be described, the application servers may also implement the automated classification techniques of this disclosure.

One or more functions of such a technology platform may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

The automated method and system of this disclosure preferably is implemented in a hardware and software infrastructure such as described above, although any computing environment may be used. The techniques herein assume the availability of videos that are retrieved or retrievable from a network, such as the Internet. Those videos may be stored in a data farm comprising a set of video servers, which servers may be located across one or more typically Internet-accessible data centers. In the alternative, a particular piece of video content to be analyzed may be retrieved and analyzed in real-time. As will be described, the system preferably comprises a set of algorithms (or, more generally, processes or functions) that include: an algorithm for sampling video frames, an algorithm for extracting signatures from sampled video frames and for comparing a set of sampled frames from one video with those of another video, an algorithm for computing a match score between two videos, an algorithm for comparing a temporal order of matching frames between two videos, and an algorithm for categorizing videos based on relevance with a source video. These algorithms may be combined with one another, or implemented discretely. One or more of the algorithms may be executed as local or remote processes on one or more computing entities. The system also preferably uses one or more data stores, databases or memory for storing video content, data structures, computed data, and other relevant data sets.

FIG. 1 illustrates the automated method in block diagram form. The system takes as input a source video 100 and a set of one or more query or "candidate" videos 102. The primary purpose of the method is to determine whether a particular query video 102 is an instance (in effect, a copy) of the source video 100, or some variant or modified version of the source video, where a variant or modified version may differ (from the source video) in terms of quality, temporal order, frame size, orientation or other properties. In one illustrative (but non-limiting) embodiment, the automated method classifies a particular query video 102 in of several classifications, e.g., the "same as" the source video, a "variant" of the source video, and "not" the source video. Other classifications may be determined as well, e.g., how "close" a particular query video is to a source video, whether a particular portion of a query video matches a particular portion of a source video, and so forth. In a first operation, preferably both the source and query videos are down-sampled 104. This periodic sampling is then used as input to the remainder of the process. In particular, and based on the sampled static image frames, a set of static image frames in the candidate video that match a corresponding set of static image frames in the source video are then identified. There are several known ways in which matching frames may be identified. In a preferred embodiment, this identification is effected using a feature transform, such as oriented binary robust independent elementary features (ORB).

FIG. 1 illustrates the feature transform process generally as including several functions, namely, key-point detection 105, descriptor extraction 106, and descriptor matching 108. Thus, according to the feature transform process, a candidate frame (e.g., selected by periodic sampling) and a certain number of frames around the candidate frame, are evaluated, and a single frame is selected based on the entropy and the standard deviation of the frames. This is step 105. The feature transform is applied to the sampled frames and feature transform descriptors are extracted at step 106. The descriptors for each frame of the source video are compared with those for each frame of the query video. This is step 108. A match score is assigned to the frames based on the number of matching descriptors. This is step 110. The particular feature transform functions may vary depending on the transform implemented. Thus, the above steps 105, 106, 108 and 110 are merely representative and should not be construed as required.

While ORB is a preferred matching algorithm, it is not limiting. Other representative algorithms of this class/type include, without limitation, scale-invariant feature transformation (SIFT), speeded-up robust features (SURF), and others.

The process then continues with an optional geometric verification operation 112, which provides a content comparison of the sets of "matching" static image frames to determine whether any pair of matched frames should be discarded (as potentially mismatched). In this step, a geometric verification is performed to discard erroneous matches. Without limitation, a representative geometric verification involves the use of a random sample consensus (RANSAC) algorithm to learn an affine transform that most key-point matches agree upon. Those frames that do not satisfy the constraints are discarded as "mismatching" frames. While RANSAC is a preferred geometric verification algorithm, it is not limiting. Other representative algorithms of this class/type include, without limitation, the Hough transform.

After the mismatched frames are discarded, the routine then continues at step 114 to determine how closely a temporal order of the set of static image frames in the candidate video matches the temporal order of the set of static image frames in the source video. As will be described in more detail below, the metadata typically comprises indices of the matching static image frames. Based on a measure of temporal order match, a classification is then applied to the candidate video at step 116 to complete the method. Typically, and as noted above, the classification is that the candidate video is an instance of the source video (category 1), not an instance of the source video (category 2), or a variant of the source video (not shown).

The matching frames in the two videos are evaluated to measure how closely they match on temporal order. Finally, based on how closely the query video matches the source video in terms of the video content and the temporal order it is assigned to one of the user-defined categories.

Figure 2:
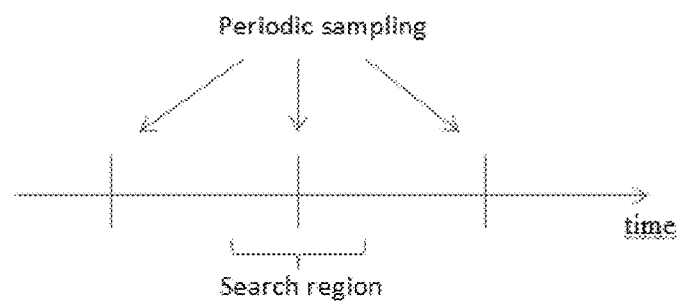
FIG. 2 illustrates how intelligent sampling is used to ensure that stable frames are selected for the matching process.

There is no requirement that any particular sampling algorithm (step 102) be used, and any known technique may be used for this purpose. Typically, frames are sampled periodically, and the period may be varied. As illustrated in FIG. 2, to avoid unstable frames, preferably a search region 202 is defined around the frames determined by periodic sampling. For all the frames in the search region, the variance and entropy are calculated. The frames with the highest variance and entropy generally correspond to stable frames, and these one or more frames are selected for further processing (by the ORB or other transform algorithm). In a preferred embodiment, the two frames with the highest variance and entropy are selected, and the frame with the highest number of transform features is picked for the further processing.

Figure 3:
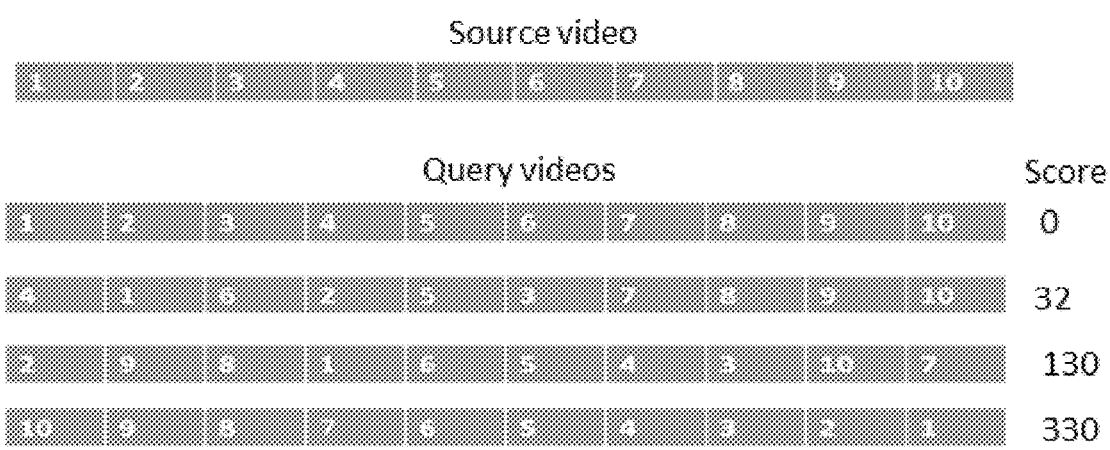
FIG. 3 illustrates how temporal order scores are evaluated to determine matching video frames.

Key-point matching provides a measure of how closely the content of one video matches the other. Such matching, however, does not take into account the order of frames in the two videos. According to this disclosure, a key-point algorithm is enhanced to take such frame order into consideration. In a preferred approach, the algorithm determines how closely the order of frames in one video matches that in the other. The algorithm generally works as follows, with reference to FIG. 3. The algorithm takes as input the indices of matching frames in the two videos. The enhanced key-point matching algorithm then selects the frames of source video in their original order; therefore, the matching frame indices in the source video are in the sorted order. For a query video with the same frame ordering as the source video, the matching frames in the query video will also be sorted; otherwise, they will be out of sorted order. The algorithm sorts the matching frame indices in the query video and then determines how far each frame in the original order is from its sorted order position. In a preferred approach, the sum of this difference is then computed and used as a measure of temporal order mismatch between the source and query videos. FIG. 3 illustrates several example scores using this approach. As can be seen, the sorted order produces a zero score, whereas a reverse sort order (the bottom example) produces a highest score.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Having described our invention, what we now claim is as follows.

The invention claimed is:

1. An automated method to determine whether a candidate video is an instance or a variant of a source video, wherein each video comprises a collection of static image frames, the method comprising:
   sampling static image frames from each of the candidate video and the source video, the static image frames in the source video being in a sequence;
   identifying, using the sampled static image frames and a feature transform executing in a hardware element, a set of static image frames in the candidate video that match a corresponding set of static image frames in the source video;
   comparing metadata associated with the sets of matching static image frames to determine how closely a temporal order of the set of static image frames in the candidate video matches the temporal order of the set of static image frames in the source video, the temporal order being an ordering of static image frames relative to one another; and
   based on a measure of temporal order match, the measure providing an indication of an extent to which the static image frames in the candidate video are out-of-sequence relative to their sequence in the source video, applying a classification to the candidate video.

2. The automated method as described in claim 1 wherein the classification is that the candidate video is an instance of the source video.

3. The automated method as described in claim 1 wherein the classification is that the candidate video is not an instance of the source video.

4. The automated method as described in claim 1 wherein the classification is that the candidate video is a variant of the source video according to a given characteristic, the given characteristic being one of: quality, temporal order, frame size, and orientation.

5. The automated method as described in claim 1 wherein the feature transform is an oriented binary robust independent elementary (ORB) feature transformation.

6. The automated method as described in claim 1 wherein the method further includes performing a content comparison of the sets of matching static image frames to determine whether any pair of matched frames should be discarded prior to the comparing step.

7. The automated method as described in claim 6 wherein the content comparison applies a geometric verification algorithm to the sets of matching static image frames.

8. The automated method as described in claim 6 further including discarding one or more pairs of matched static image frames that have been found, by the content comparison, to have been mismatched.

9. The automated method as described in claim 1 wherein the metadata comprises indices of the matching static image frames.

10. The automated method as described in claim 9 wherein the comparing step comprises:
  comparing a sort order of the indices of the matching static image frames in the candidate video to a sort order of the indices of the matching static image frames in the source video to determine a difference value, the difference value representing how far each image frame in the candidate video is from its sort order position in the source video; and
  computing a sum of the difference values to generate the measure of temporal order match.

11. The automated method as described in claim 1 further including selecting static image frames to be sampled.

12. The automated method as described in claim 11 wherein the selecting step comprises:
  selecting a search region representing a portion of the source video or the candidate video;
  performing periodic sampling of the frames in the search region;
  computing variance and entropy values associated with the frames in the search region; and
  identifying the static image frames for sampling based on the computed variance and entropy values.

13. The automated method as described in claim 1 wherein the candidate video is downloaded from an Internet-accessible location.

14. An article comprising a tangible non-transitory machine-readable medium that stores a program, the program being executable by a machine to perform a method to determine whether each of a set of videos received from one or more Internet-accessible locations is an instance or a variant of a source video, wherein each video comprises a collection of static image frames, the method comprising:
  receiving the set of videos from one or more Internet-accessible locations;
  for each of the candidate videos, performing the following steps:
    sampling static image frames from each of the candidate video and the source video, the static image frames in the source video being in a sequence;
    identifying, using the sampled static image frames, a set of static image frames in the candidate video that match a corresponding set of static image frames in the source video;
    comparing metadata associated with the sets of matching static image frames to determine how closely a temporal order of the set of static image frames in the candidate video matches the temporal order of the set of static image frames in the source video, the temporal order being an ordering of static image frames relative to one another; and
    based on a measure of temporal order match, the measure providing an indication of an extent to which the static image frames in the candidate video are out-of-sequence relative to their sequence in the source video, classifying the candidate video as a copy of the source video.

15. The article as described in claim 14 wherein the method further includes performing a content comparison of the sets of matching static image frames to determine whether any pair of matched frames should be discarded prior to the comparing step.

16. The article as described in claim 15 wherein the method further includes discarding one or more pairs of matched static image frames that have been found, by the content comparison, to have been mismatched.

17. The article as described in claim 14 wherein the metadata comprises indices of the matching static image frames.

18. The article as described in claim 17 wherein the comparing step of the method further comprises:
  comparing a sort order of the indices of the matching static image frames in the candidate video to a sort order of the indices of the matching static image frames in the source video to determine a difference value, the difference value representing how far each image frame in the candidate video is from its sort order position in the source video; and
  computing a sum of the difference values to generate the measure of temporal order match.

19. The article as described in claim 14 wherein the method further includes selecting static image frames to be sampled.

20. An apparatus, comprising:
  one or more processors;
  computer memory holding computer program instructions executed by the one or more processors to provide an automated method to determine whether a candidate video is an instance or a variant of a source video, wherein each video comprises a collection of static image frames, the method comprising:
    sampling static image frames from each of the candidate video and the source video, the static image frames in the source video being in a sequence;
    identifying, using the sampled static image frames and a feature transform executing in a hardware element, a set of static image frames in the candidate video that match a corresponding set of static image frames in the source video;
    comparing metadata associated with the sets of matching static image frames to determine how closely a temporal order of the set of static image frames in the candidate video matches the temporal order of the set of static image frames in the source video, the temporal order being an ordering of static image frames relative to one another; and
    based on a measure of temporal order match, the measure providing an indication of an extent to which the static image frames in the candidate video are out-of-sequence relative to their sequence in the source video, applying a classification to the candidate video.

* * * * *